United States Patent [19]

Morgan

[11] Patent Number: 4,499,490
[45] Date of Patent: Feb. 12, 1985

[54] SCANNING APPARATUS WITH VIDEO CAMERA

[76] Inventor: Jack B. Morgan, 1657 Parkhills Ave., Los Altos, Calif. 94022

[21] Appl. No.: 376,326

[22] Filed: May 10, 1982

[51] Int. Cl.³ .................. H04N 7/00; H04N 7/18; H04N 5/26

[52] U.S. Cl. .................. 358/87; 358/108; 358/225

[58] Field of Search ............. 358/87, 225, 108, 125, 358/100

[56] References Cited

U.S. PATENT DOCUMENTS

| 2,905,758 | 9/1959 | Walker | 358/225 |
| 3,505,465 | 4/1970 | Rees | 358/87 |
| 3,780,224 | 12/1973 | Levine | 358/87 |
| 3,868,706 | 2/1975 | Steingold | 358/225 |
| 3,959,582 | 5/1976 | Law et al. | 358/87 |
| 4,024,573 | 5/1977 | Carnes | 358/225 |

Primary Examiner—John C. Martin
Assistant Examiner—Victor R. Kostak
Attorney, Agent, or Firm—Townsend and Townsend

[57] ABSTRACT

Apparatus for moving a mirror about a horizontal axis and a vertical axis so that the mirror can scan in all directions and up and down to receive light rays representing images of distant objects and to direct the light rays to a video camera adjacent thereto. The video camera is in a fixed position in a housing and faces upwardly in optical alignment with the center of the mirror. A pair of vertically spaced ring gears are mounted in the housing for rotation relative to the video camera, and a pair of drive motors are coupled with respective ring gears for rotating the same in opposed directions relative to each other. One of the ring gears has a pair of posts which extend upwardly and terminate at the sides of the mirror. The mirror has a pair of stub shafts rotatably mounted in the upper ends of the post so that the mirror can rotate about a horizontal axis even as the first ring gear rotates about the vertical axis of the mirror. A worm gear assembly is coupled to one of the stub shafts of the mirror and extends downwardly and is coupled to the other ring gear so that rotation of the second ring gear causes the mirror to rotate about its horizontal axis. A transparent window surrounds the mirror and allows scanning movement of the mirror continuously in one direction and through an arc in a vertical plane having an angle in the range of 45 degrees to 90 degrees.

21 Claims, 3 Drawing Figures

SCANNING APPARATUS WITH VIDEO CAMERA

This invention relates to improvements in scanning techniques which permit images of distant objects to be displayed on a television monitor after light rays representing the images have been directed into a video camera and, more particularly, to a scanning apparatus for use in scanning a field of view in all directions in a horizontal plane and in a limited angle in a vertical plane.

BACKGROUND OF THE INVENTION

Scanning devices using video cameras have been known and used in the past. Representative disclosures in the field include U.S. Pat. Nos. 3,505,465, 3,780,224, 3,868,706 and 4,024,573. U.S. Pat. No. 3,505,465 shows a viewing system for an armored vehicle in which incoming light is reflected from a convex mirror and reflected upwardly to a second convex mirror and then reflected downwardly to a television camera rotatably mounted in a housing. U.S. Pat. No. 3,780,224 shows a viewing system having three television cameras, all of which rotate in a housing with a mirror thereabove. U.S. Pat. No. 3,868,706 discloses a viewing system in which a television camera is secured to a rotatable turret which carries a mirror. The mirror rotates about a horizontal axis in the turret but the turret and mirror rotate with the television camera as a unit about a vertical axis. U.S. Pat. No. 4,024,573 discloses a viewing system in which a television camera is associated with a double dove prism mounted in front of the camera and rotatable by a drive motor.

In all the foregoing disclosures, the camera is rotated with the scanning reflector, and this limitation raises the problem of handling the electrical cables from the television camera to electronic circuitry including a television monitor for viewing the images represented by the video signals of the camera. Because of this problem, a need has arisen for an improved viewing system capable of scanning a field of view continuously in one direction about a vertical axis and at least within a limited angle about a horizontal axis.

SUMMARY OF THE INVENTION

This present invention satisfies the aforesaid need for providing a scanning apparatus which includes a mirror above a fixed video camera wherein the mirror can rotate about a horizontal axis and a vertical axis relative to the video camera by operation by a pair of drive motors. In this way, the mirror can rotate for long periods of time in one direction about the vertical axis and can be pivoted at least through a limited angle in a vertical plane about the horizontal axis as the mirror is rotated about its vertical axis. This capability of the present invention assures that complete scanning over long periods of time can be achieved without having to rotate the video camera so that the problem of handling electrical cables from the video camera are avoided. Thus moinitoring of a panoramic field of view can be accomplished in a simple manner and with a design configuration which is simple and rugged yet is inexpensive to produce and maintain.

The primary object of the present invention is to provide an improved scanning apparatus having a mirror aligned with a video camera wherein the mirror can rotate about horizontal and vertical axes relative to the video camera to permit continuous scanning of a panoramic field of view without limitation in the rotation about the vertical axis and over a wide angle of movement of the mirror in a vertical plane about a horizontal axis.

Other objects of this invention will become apparent as the following specification progresses, reference being had to the accompanying drawings for an illustration of the invention.

IN THE DRAWINGS

Figure 1:
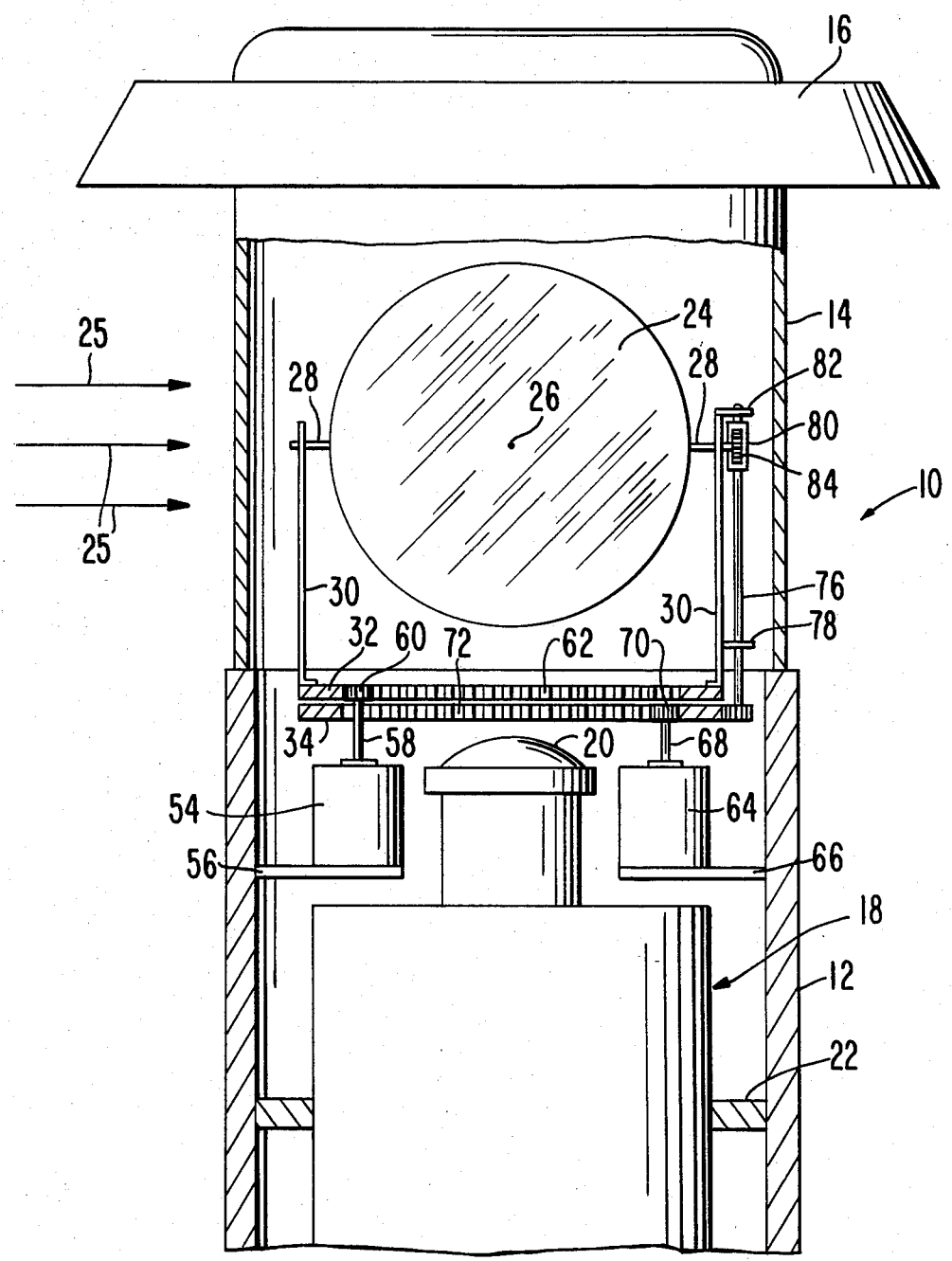
FIG. 1 is a vertical section through a housing containing a stationary video camera and a plane mirror mounted in the housing for rotation relative to the video camera about a horizontal axis and a vertical axis.

The scanning apparatus of the present invention is broadly denoted by the numeral 10 and includes a hollow cylindrical housing 12 and a hollow cylindrical transparent window 14 mounted on the upper end of the housing. A cover 16 is mounted on the top of window 14 for closing the upper end thereof. Housing 12 is adapted to be placed on a suitable support, such as the upper end of a post which is held at its lower end in the ground or on a base. A particular application of apparatus 10 is for security monitoring of a parking lot or the interior of a warehouse.

A video camera 18 is mounted by brackets 22 in a fixed position in housing 12. Camera 18 is directed upwardly and has a lens 20 which receives images of distant objects from a mirror 24 thereabove in a manner to be described. These images are then converted by the camera into video signals and the video signals are directed to a television monitor and reconverted to visual images for viewing purposes.

Mirror 24 is mounted in the interior space of window 14 for rotation about a horizontal axis and for rotation about a generally vertical axis. Mirror 24 serves to receive incoming light rays 25 (FIG. 1) passing through window 14 and then to reflect such light rays downwardly and into camera 18 through lens 20 thereof. Thus, mirror 24 is vertically aligned with lens 20, and the midpoint 26 of mirror 24 is on the optical center line of lens 20.

Figure 3:
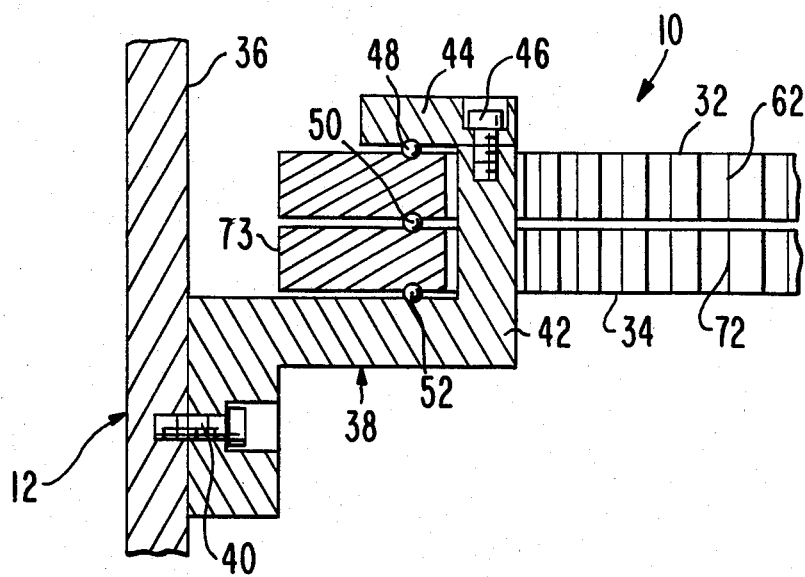
FIG. 3 is an enlarged cross-sectional view taken along line 3—3 of FIG. 2.

Mirror 24 has a pair of diametrically opposed stub shafts 28 which are rotatably carried by a pair of side posts 30 secured to and extending upwardly from a first ring gear 32 mounted in the upper end of housing 12 as shown in FIG. 1. Ring gear 32 is vertically aligned with and slightly spaced above a second ring gear 34, ring gears 32 and 34 being coupled in the manner shown in FIG. 3 to the inner surface 36 of housing 12. To this end, a plurality of circumferentially spaced brackets 38 are secured by screws 40 to housing 12 and each bracket has an upright extension 42 provided with a removable, retainer member 44 thereon secured by a screw 46 to the upper face of extension 42. Ring gears 32 and 34 are rotatably mounted in the space between each bracket 38 and the respective member 44 by bearings denoted by the numerals 48, 50 and 52. Thus, ring gears 32 and 34 are mounted on housing 12 for rotation about a generally vertical axis, and this axis is the optical axis of lens 20.

A first drive motor 54 is carried by a bracket 56 (FIG. 1) secured to housing 12, and motor 54 has a drive shaft 58 provided with a gear 60 in mesh with the gear means 62 on the inner surface of ring gear 32. Thus, when motor 54 is actuated, ring gear 32 rotates about the optical axis of lens 20 relative to video camera 18. As ring gear 32 rotates, it also rotates mirror 24 about a generally vertical axis, namely, the optical axis of shaft 20. Thus, mirror 24 can continuously scan 360 degrees in either direction.

Figure 2:
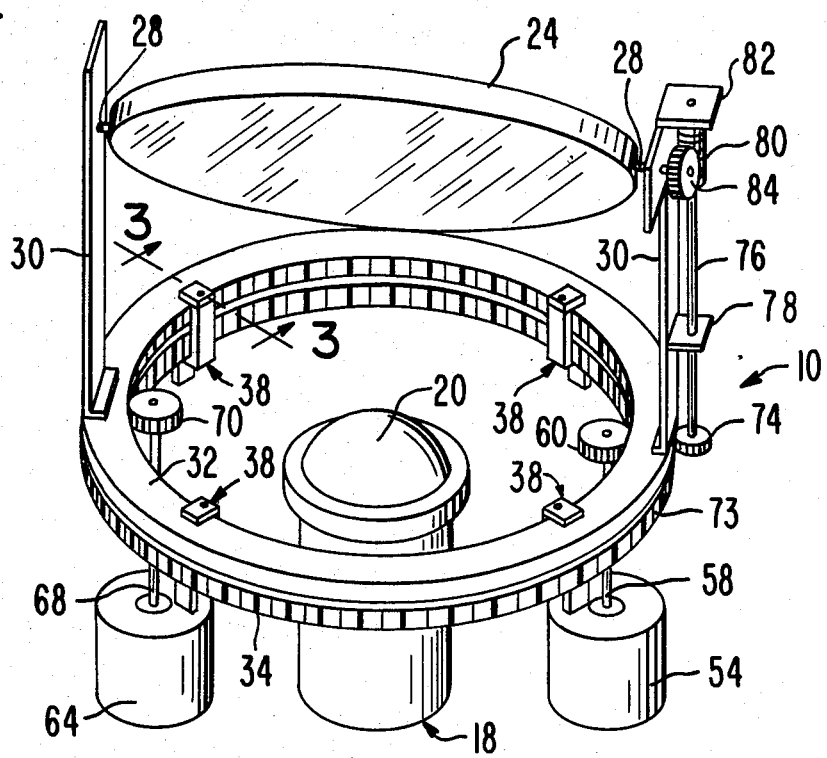
FIG. 2 is a perspective of the mirror and its mounting means and the means for moving the mirror about the horizontal and vertical axes thereof.

A second motor 64 is mounted by a bracket 66 (FIG. 1) on housing 12 on the opposite side of lens 20 from motor 54. Motor 64 has a drive shaft 68 provided with a gear 70 in mesh with the gear means 72 on the inner periphery of ring gear 34. The outer periphery of ring gear 34 has gear means 73 thereon in mesh with a second spur gear 74 coupled to the lower end of a shaft 76 rotatably mounted on one of the posts 30 by bearings 78 and 82. The upper end of shaft 76 has a worm 80 on the upper end thereof as shown in FIG. 2, the worm being below the second bearing 82. Worm 80 is in mesh with a worm gear 84 which is secured to the outer end of one of the stub shafts 28. When motor 64 is actuated, ring gear 34 is rotated to cause rotation of shaft 76 which, in turn, causes rotation of shafts 28 to pivot mirror 24 about the horizontal axis of shaft 28.

In operation, when mirror 24 is assembled above video camera 18 as shown in FIG. 1, motors 54 and 64 are energized selectively to cause scanning of mirror 24 about its horizontal and vertical axes. The mirror can be pivoted about its horizontal axis as it rotates about its vertical axis. Thus, the mirror can be made to be fixed at any angle relative to the vertical and to scan about its vertical axis at that angle. Then, after scanning through 360 degrees at one angle, the angle can be changed so that the mirror can be scanned through 360 degrees at the second angle, and so on. Typically, the range of such angles will be 45° to 90°, but this is only by way of illustration. In any case, the mirror rotates relative to video camera 18 since the camera is in a fixed position within housing 12. Because the camera does not rotate, there is no need to accommodate the rotation of electrical cables extending away from the camera. However, it may be necessary to electronically process the video signals from camera 18 in a manner such that the visual images seen on the television monitor coupled with the camera will be always upright rather than be inverted which they ordinarily would be due to the rotation of mirror 24 relative to camera 18 above lens 20.

Suitable controls can be coupled with motors 54 and 64 to assure a predetermined scan of mirror 24 over a certain time period. Such controls also permit manual override of the movement of mirror 24 so that the mirror can be made to scan through a limited arc about its vertical axis and through a limited arc about its horizontal axis. In this way, a specific location can be monitored in case the possibility of a security breach at such location and such security breach can be visually observed immediately.

What is claimed is:

1. Scanning apparatus comprising:
   a housing;
   a video camera secured in a fixed position in the housing and having a generally vertical optical axis;
   a mirror;
   means including rotatable first and second gears for mounting the mirror above the video camera for rotation about a generally vertical axis and for rotation about a generally horizontal axis relative to the video camera; and
   a pair of drive motors coupled with respective gears for rotating the mirror about said vertical and horizontal axes, each motor being secured in a fixed position on the housing.

2. Scanning apparatus as set forth in claim 1, wherein is included a transparent window surrounding the mirror and coupled to the upper end of the housing.

3. Scanning apparatus as set forth in claim 1, wherein said mirror is a plane mirror and has a center point coincident with the optical axis of the video camera.

4. Scanning apparatus as set forth in claim 1, wherein the first gear is coupled with the mirror for mounting the same for rotation about said vertical axis, and the second gear being provided for mounting the mirror for rotation about said horizontal axis.

5. Scanning apparatus as set forth in claim 4, wherein is included a bracket means for mounting the first gear and the second gear on the housing for rotation about said vertical axis.

6. Scanning apparatus as set forth in claim 4, wherein the first gear has a pair of posts secured thereto and extending upwardly therefrom, said mirror being mounted on the upper ends of the posts for rotation therewith about said vertical axis.

7. Scanning apparatus as set forth in claim 6, wherein said mirror has a pair of diametrically opposed stub shafts, said stub shafts being mounted in the upper ends of the post for rotation about said horizontal axis.

8. Scanning apparatus as set forth in claim 7, wherein is included worm gear means coupling the second gear with the stub shafts for rotating the same about said horizontal axis.

9. Scanning apparatus comprising:
   a housing;
   a video camera in the housing and having a generally vertical optical axis;
   a mirror having a pair of diametrically opposed stub shafts;
   means mounting the mirror above the video camera for rotation about a generally vertical axis and for rotation about a generally horizontal axis relative to the video camera;
   first gear means coupled with the mirror for rotating the same about said vertical axis; and
   second gear means for mounting the mirror for rotation about said horizontal axis, the first gear means having a pair of posts secured thereto and extending upwardly therefrom, said stub shafts of the mirror being mounted on the upper ends of respective posts for rotation about said horizontal axis, there being worm gear means including a second shaft rotatably mounted on one of the posts, a spur gear carried on one end of said second shaft and coupled with the second gear means for rotating the second shaft as the second gear means rotates about said vertical axis, a worm on the other end of ths shaft, a worm gear in mesh with the worm and carried by one of the stub shafts on said mirror.

10. Scanning apparatus comprising:
    a housing;
    a video camera in the housing and having a generally vertical optical axis;
    a mirror;
    means including first and second ring gears for mounting the mirror above the video camera for rotation about a generally vertical axis and for rotation about a generally horizontal axis relative to the video camera, the ring gears being vertically spaced apart, and including bearing means between the ring gears for allowing the same to rotate relative to each other; and means coupled with the ring gears for rotating the mirror about said vertical and horizontal axes.

11. Scanning apparatus as set forth in claim 10, wherein is included bracket means carried by the housing for rotatably supporting the ring gears.

12. Scanning apparatus as set forth in claim 10, wherein said rotating means includes a drive motor for each ring gear, respectively, each drive motor having a drive shaft provided with a gear in coupled relationship with the respective ring gear.

13. Scanning apparatus as set forth in claim 12, wherein said ring gears are rotatable about said vertical axis, each of the ring gears having gear teeth on the inner peripheral surface thereof, the gear on the drive shaft of each motor being in mesh with the gear teeth of a respective ring gear.

14. Scanning apparatus as set forth in claim 10, wherein one ring gear is above the other ring gear, there being a pair of posts secured to and extending upwardly from said one ring gear at diametrically spaced locations thereon, said mirror being rotatably mounted on the posts at the upper ends thereof.

15. Scanning apparatus as set forth in claim 14, wherein the mirror has a pair of diametrically opposed stub shafts thereon pivotally carried by said posts, and means coupling said other ring gear with one of said stub shafts for rotating the mirror about said horizontal axis as a function of the rotation of the other ring gear about said vertical axis.

16. Scanning apparatus as set forth in claim 15, wherein said other ring gear has gear teeth on the outer periphery thereof, said worm means includes a first shaft rotatably mounted on one of the posts and extending longitudinally thereof, a spur gear secured to the lower end of the shaft and in mesh with the gear teeth on the outer periphery of the other ring gears, and a worm gear assembly coupling the other end of the shaft with one of said stub shafts on the mirror.

17. A method of scanning a circular field of view comprising:

providing a stationary video camera adjacent to and in optical alignment with a mirror rotatable about a pair of axes;

mounting a pair of parallel planar members adjacent to each other for rotation relative to each other and to a fixed reference;

rotating said mirror about one axis as a function of the rotation of one of said planar members relative to said fixed reference; and rotating said mirror about the other axis as a function of the rotation of the other planar member relative to said reference.

18. A method as set forth in claim 17, wherein the rotative force for each of said planar members, respectively, emanates from a location fixed relative to said reference.

19. A method as set forth in claim 17, wherein said mirror is rotated about a horizontal axis as the mirror rotates about said vertical axis.

20. A method as set forth in claim 19, wherein said mirror rotates continuously in said one direction about said vertical axis for a predetermined time period, said mirror being rotatable about said horizontal axis through an angle in the range of 45° to 90°.

21. A method as set forth in claim 17, wherein said mirror is a plane mirror.

* * * * *